United States Patent [19]

Wong

[11] Patent Number: 5,264,872
[45] Date of Patent: Nov. 23, 1993

[54] RASTER OUTPUT SCANNER WITH IMPROVED PROCESS DIRECTION REGISTRATION

[75] Inventor: Lam F. Wong, Fairport, N.Y.
[73] Assignee: Xerox Corporation, Stamford, Conn.
[21] Appl. No.: 946,690
[22] Filed: Sep. 18, 1992
[51] Int. Cl.⁵ .................................. H04N 1/21
[52] U.S. Cl. .................................... 346/108
[58] Field of Search .............. 346/1.1, 107 R, 108, 346/76 L, 160; 358/296, 300, 302; 355/200, 202, 312; 324/175

[56] References Cited

U.S. PATENT DOCUMENTS

| | | | |
|---|---|---|---|
| 4,611,901 | 9/1986 | Kohyama et al. | 355/4 |
| 4,660,059 | 4/1987 | O'Brien | 346/157 |
| 5,204,620 | 4/1993 | Costanza et al. | 324/175 |
| 5,208,796 | 5/1993 | Wong et al. | 369/97 |

Primary Examiner—Mark J. Reinhart

[57] ABSTRACT

A single pass, polygon ROS system provides a plurality of latent images which may subsequently be developed in different colors. The ROS units are initially aligned so that each color image is precisely registered at the same relative position along the exposed area of a photoreceptor belt. The alignment is accomplished by detecting the entrance of the leading edge of an image frame into an image scan exposure area, detecting the instant location of the scanning beam along the surface of the particular polygon facet and either printing the first image information line with the next start of scan detection signal or the second image information line, depending upon whether the scanning beam is after or before the midpoint of the facet, respectively.

2 Claims, 5 Drawing Sheets

RASTER OUTPUT SCANNER WITH IMPROVED PROCESS DIRECTION REGISTRATION

BACKGROUND AND MATERIAL DISCLOSURE STATEMENT

This invention relates generally to a raster output scanning system for producing a high intensity imaging beam which scans across a movable photoconductive member to record electrostatic latent images thereon, and, more particularly, to an apparatus for providing improved registration of the beam in the process direction movement of the photoconductive member.

In recent years, laser printers have been increasingly utilized to produce output copies from input video data representing original image information. The printer uses a raster output scanner (ROS) to expose the charged portions of the photoconductive member to record the electrostatic latent image thereon. Generally, a raster output scanner has a laser for generating a collimated beam of monochromatic radiation. The laser beam is modulated in conformance with the image information. The modulated beam is reflected through a lens onto a scanning element, typically a rotating polygon having mirrored facets. The light beam is reflected from a facet and thereafter focused to a "spot" on the photosensitive member. The rotation of the polygon causes the spot to scan linearly across the photoconductive member in a fast scan (i.e., line scan) direction. Meanwhile, the photoconductive member is advanced relatively more slowly than the rate of the fast scan in a slow scan direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper.

Laser printers may operate in either a single pass or multiple pass system. In a single pass, color xerographic system, three ROS stations are positioned adjacent to a photoreceptor surface and selectively energized to create successive image exposures, one for each of the three basic colors. A fourth ROS station may be added if black images are to be created as well. In a multiple pass system, each image area on the photoreceptor surface must make at least three revolutions (passes) relative to the transverse scan line formed by the modulated laser beam generated by a ROS system. With either system, each image must be superimposed (registered) to within a 0.1 mm circle or within a tolerance of ±0.05 mm. Each color image must be registered in both the photoreceptor process direction (skew registration) and in the direction perpendicular to the process direction (referred to as the fast scan or transverse registration).

Various techniques are known in the prior art for registering multiple image exposures in both the transverse and process direction. Copending U.S. application, Ser. Nos. 07/635,835 and 07/807,927, both assigned to the same assignee as the present invention, disclose two of such techniques. The contents of these applications are hereby incorporated by reference. The Ser. No. 07/807,927 application discloses a preferred embodiment of a ROS scanning system to which the present invention has utility. FIG. 1 shows a prior art, single pass, ROS color printing system 8 having four ROS systems, 10, 12, 14, and 16. The system 8 includes a photoreceptor belt 18, driven in the process direction, indicated by the arrow 19. The length of the belt 18 is designed to accept an integral number of spaced image areas $I_1-I_n$ represented by dashed line rectangles in FIG. 1. Upstream of each image area is a charging station (not shown) which places a predetermined electrical charge on the surface of belt 18. As each of the image areas $I_1-I_n$ reaches a leading edge transverse line of scan, represented by lines 20a–20d, a lead edge signal is generated by a belt hole/sensor and the image area is progressively exposed on closely spaced transverse raster lines 22, shown with exaggerated longitudinal spacing on the image area $I_4$ in FIG. 1. Each image area $I_1-I_n$ is exposed successively by ROS systems 10, 12, 14, 16. Downstream from each exposure station, a development station (not shown) develops the latent image formed in the preceding image area. A fully developed color image is then transferred to an output sheet. Details of charge and development xerographic stations in a multiple exposure single pass system are disclosed, for example, in U.S. Pat. Nos. 4,660,059 and 4,611,901, whose contents are hereby incorporated by reference. The charge, development, and transfer stations are conventional in the art. Each ROS system contains its own conventional scanning components, of which only two, the laser light source and the rotating polygon, are shown. The particular system 10 has a gas, or preferably, laser diode 10a, whose output is modulated by signals from control circuit 30 and optically processed to impinge on the facets of rotating polygon 10b. Each facet reflects the modulated incident laser beam as a scan line, which is focused at the photoreceptor surface. Control circuit 30 contains the circuit and logic modules which respond to input video data signals and other control and timing signals to operate the photoreceptor drive synchronously with the image exposure and to control the rotation of the polygon 10b by a motor (not shown). The other ROS systems 12, 14, 16, have their own associated laser diodes 12a, 14a, 16a, and polygons 12b, 14b, 16b, respectively. In the system of FIG. 1, transverse alignment of each successive image exposure is obtained by providing horseshoe shaped sensor/light emitter units 36a, 36b, 36c, 36d, which cooperate with apertures T1, T2, T3, T4, respectively, formed in the belt surface to provide the lead edge signal. The top part of unit 36 contains a light source and the bottom leg contains a sensor. Further details regarding transverse alignment registration are described in the aforementioned application Ser. No. 07/635,835.

The above-described techniques can result in a registration error of up to one scan line spacing. This is due to the fact a lead edge signal generated by a hole/sensor is dependent upon the instantaneous position of the rotating polygon or, more particularly, the position of the scan beam on the instantaneous scanning facet. The drive control for operation of the laser is delayed until the beam is swept across the instant facet on the scan line and the lead edge scan line is written with arrival of the next facet. Thus, the worst case lead edge misregistration is approximately one scan line spacing. As an example, for a scanner having resolution of 400 spots per inch (spi), the error could be 0.0025 inch. This error could be minimized by increasing the resolution of the system, thereby decreasing the scan line spacing and hence the maximum misregistration. However, this is an expensive solution and, given the state of the art, even 600 spi systems are difficult to achieve.

The present invention is directed towards reducing the lead edge registration error by a factor of 2 so that, for the example given above of a 400 spi system, the maximum lead edge registration error would 0.00125 inch. This is realized by providing detection and control circuitry which identifies the beam position on the polygon facet at the time the leading edge sensor generates an output signal. Discrimination circuitry determines whether the beam is before or after the mid-scan position on the instantaneous scanning facet and enables the leading edge start-of-scan to occur beginning with the next facet (if the beam is past the midpoint position) or to discard the scan line formed when the beam is prior to the midpoint position and to wait for the next facet to begin the lead edge scan. With either event, the error is less than ½ scan line spacing with a maximum error occurring when the beam is exactly at the midpoint position.

More particularly, the present invention relates to an imaging system for forming multiple image exposure frames on a photoconductive member during a single pass including:

a photoreceptor belt adapted to accommodate the formation of an integral number of image exposure frames, a plurality of Raster Output Scanners (ROS) units, each ROS unit forming one of said image exposure frames, each ROS unit projecting a plurality of scanning beams in a fast scan (transverse) direction across the belt width, by scanning modulated beams from the facet surfaces of a rotating polygon, each facet having a width W, start of scan (SOS) and end of scan (EOS) sensor means for controlling the start and end of the scanning beams, belt position detector means for detecting the location of the leading edge of an exposure frame and for generating an output signal to the ROS unit to write the first line of the image frame, and control circuitry for detecting the instantaneous scanning beam position on the instantaneous scanning facet at the time of generation of said belt position detector means output signal and for controlling said ROS unit so as to initiate the first image scan line at the next SOS sensing if the beam position has been found at a distance along the facet greater than W/2 and to initiate the second image scan line at the next SOS sensing if the beam position is at a distance along the facet which is less than W/2.

BRIEF DESCRIPTION OF THE DRAWINGS

Referring now to FIG. 2, a modified version of FIG. 1 is shown with only one of the ROS systems 10 being illustrated. The system has been modified by the addition of control circuitry which will provide for registration of lead edge lines 20a–20d, with a subpixel of accuracy. Each image frame is formed when the associated belt hole/light emitter unit is detected by the particular belt hole sensor configuration. In FIG. 2, each frame has an associated belt hole/light emitter unit, as shown in FIG. 1. Each ROS also has an associated start of scan (SOS) and end of scan (EOS) sensor, which are provided adjacent the surface of the belt 18 and astride the path of the scanning beam to generate a line sync pulse each time the beam sweeps across the belt surface. The width of the line sync pulse is dependent upon the velocity at which the associated polygon ROS is rotating; e.g. rotational speed of the drive motor 10m, for polygon 10b is only shown. ROS system 10 has a start of scan detector 10c and end of scan detector 10d. System 12 has sensors 12c, 12d, system 14 has sensors 14c, 14d, and system 16 has sensors 16c, 16d. These sensors are in a fixed position above the belt surface.

Considering first the formation of image area I₁, it will be assumed that the belt surface has been charged to the appropriate charge level. Each scan line is formed when the instantaneous scanning facet causes the scan beam to cross sensor 10d. A scan line is formed either unmodulated, so as to completely erase charge as between the inter-image areas, or a modulated line is formed in conformance with input image video signals. As aperture T1 comes within the light emitted by unit 36a, a belt hole signal is generated and sent to control circuit 30. This signal is used to form line 20a of image frame I₁. The control circuitry must wait for the rotation of the polygon facet to provide the start of scan signal which will begin writing the first line of image information.

Figure 3:
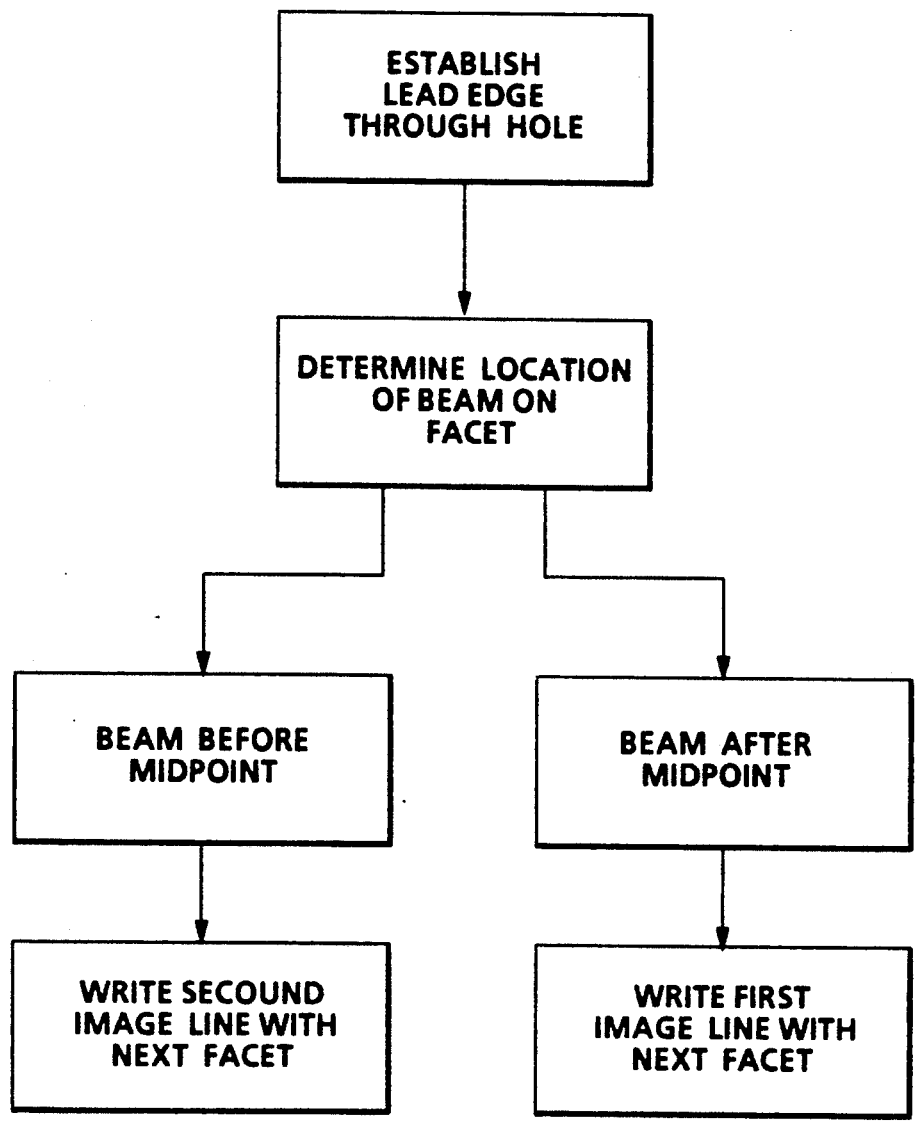
FIG. 3 is a flow diagram of the registration technique.

FIG. 3 is a flow diagram showing the steps taken to obtain the subpixel registration. The belt has moved to the point where the sensor of unit 36a senses light passing through aperture T1. A line sync signal is generated and sent to the control circuitry. The instant location of the beam along the surface of the instant scanning facet is determined. If the beam is found to be past the midpoint of the facet, a signal is sent to write the first image line using the next facet. If the beam is found to be before the midpoint of the facet, a signal is sent to write the second image line using the next facet.

Figure 4:
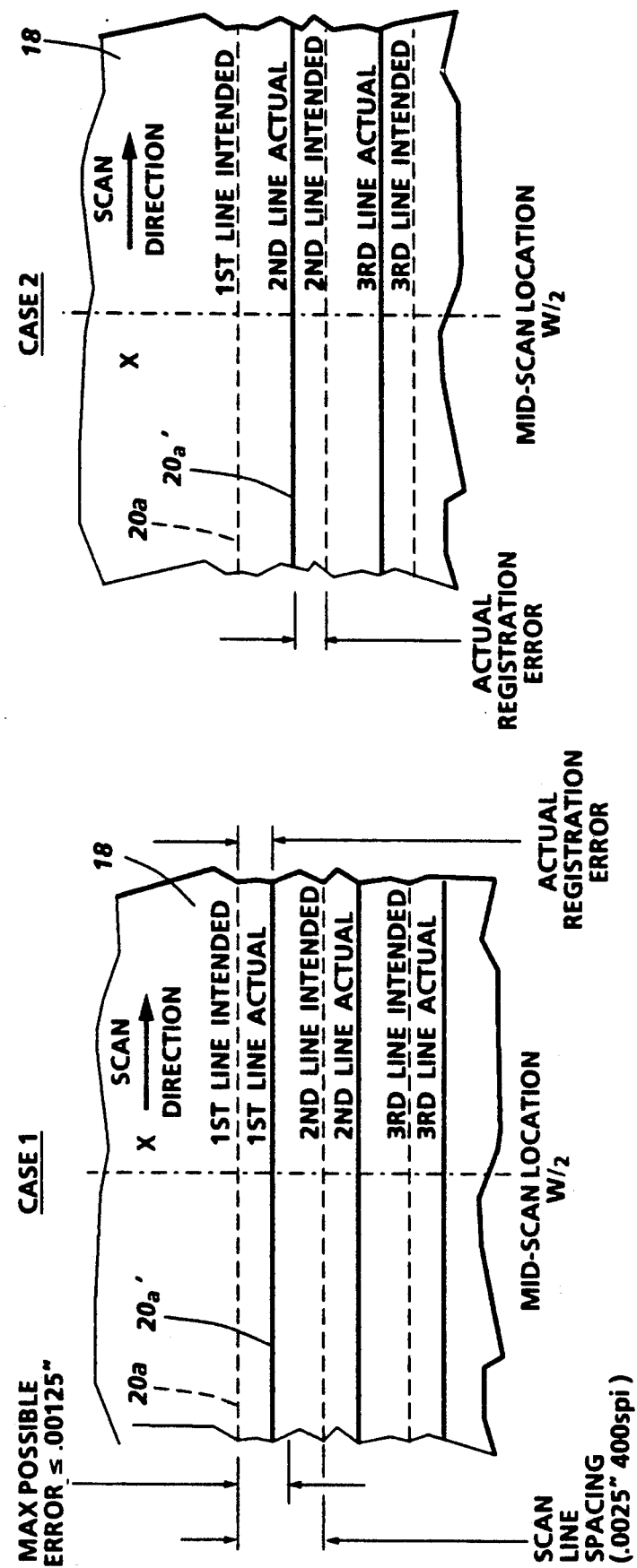
FIGS. 4a and 4b show a schematic drawing of a portion of a photoreceptor belt illustrating a scanning beam in two positions on the belt.

Referring to FIG. 4, the situation as of this point is that the belt hole sensor has detected the presence of aperture T1 and has generated a signal which will be applied to the laser driver to form a first scan line 20a of the image frame I₁. The instant location of the beam on the instantaneous scanning facet will now be determined according to the principle of the present invention. Two possible cases have been selected for purposes of enabling the invention technique and are shown in FIG. 4, but many other cases (different beam locations) are possible. FIG. 4a and 4b show the same portion of belt 18 which encompasses the leading edge of image area I₁. Case 1 (FIG. 4a) illustrates a situation where, at the instant of belt hole signal generation, the scan beam (represented by an X) is past the mid-scan position; e.g. is at a position along the width of the facet (and the scan width of the belt) which is greater than W/2, but less than W. Case 2 (FIG. 4b) illustrates a situation where the scan beam is prior to the midscan position; e.g. is at a position along the facet width which is less than W/2. With either case 1 or case 2, the dotted lines indicate the desired position of the first lead line 20a of image frame I₁ and of successive lines, separated by one scan line spacing (0.0025 inch at 400 spi). Because of the limitation of the mechanical positioning of the ROS units, the first line intended has proved impossible to achieve with accuracy. In the prior art, if the beam had just passed the start of scan sensor 10c and had begun to sweep across the facet surface, a full pixel of error (0.0025 inch) could occur before the writing of the first line; e.g. waiting for the next facet would require almost a full facet of error. According to the invention, the beam position discrimination circuitry of FIG. 5 reduces the error to ±½ scan line error or 0.00125 inch. This is accomplished by using the signal output from circuit 30 to control the laser drive so as to discard the first scan line whenever the beam location is at a point less than W/2.

Figure 1:
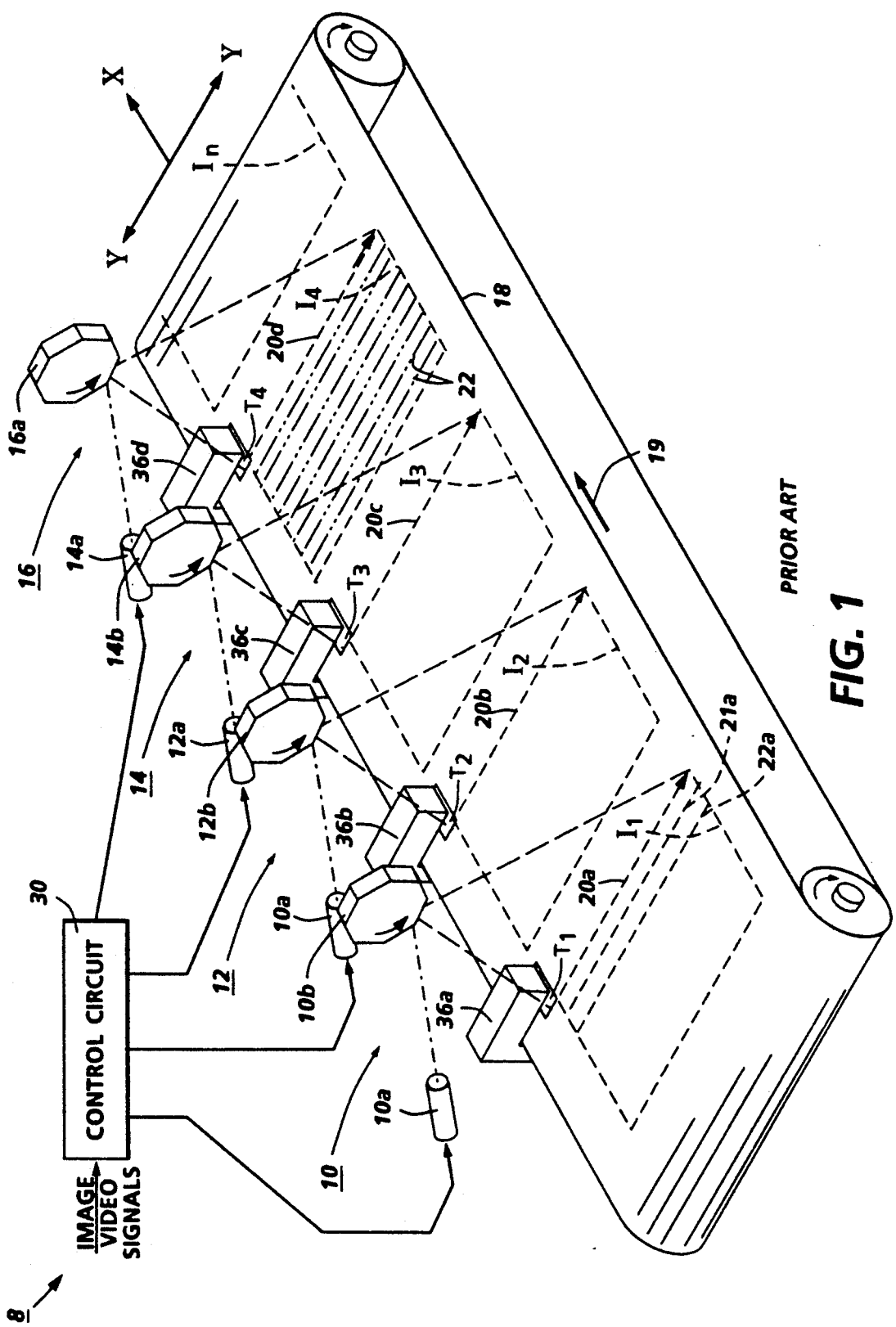
FIG. 1 shows a prior art, single-pass ROS color printing system
Figure 2:
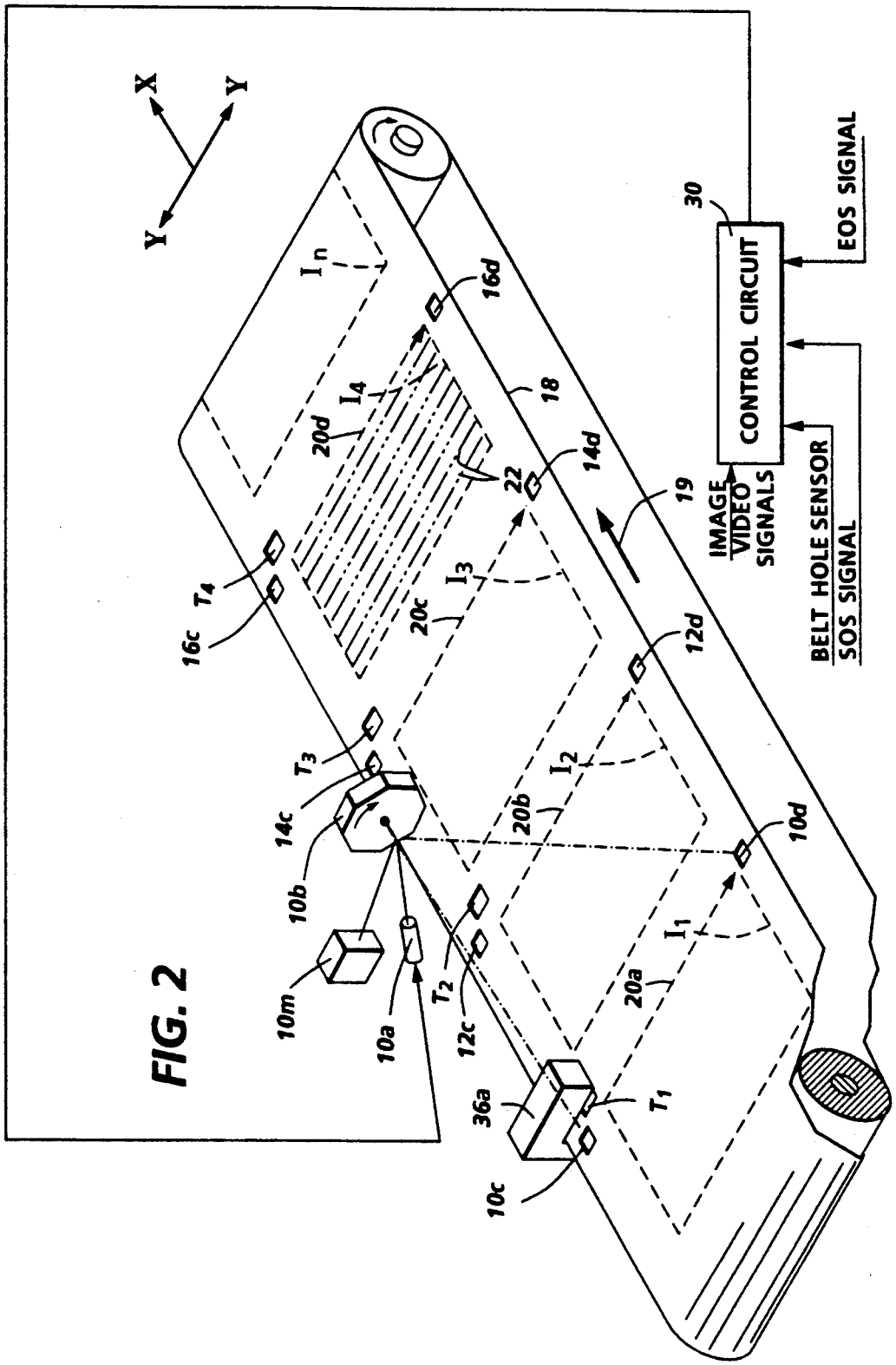
FIG. 2 is a schematic perspective of the single-pass multiple ROS system of FIG. 1 which forms registered color images in accordance with the present invention.
Figure 5:
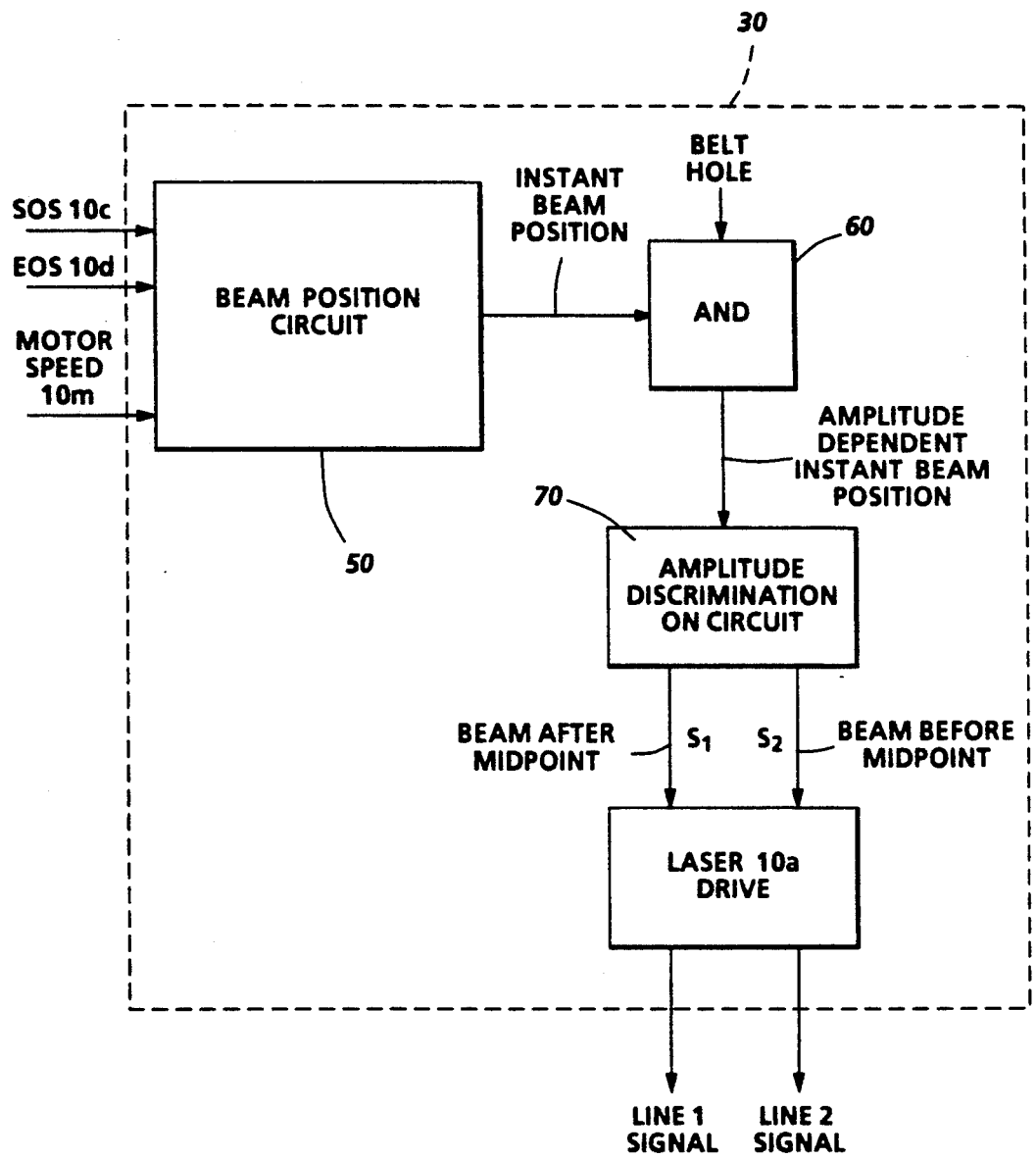
FIG. 5 is a block diagram of the control circuitry required to establish the subpixel registration.

Referring now to FIG. 5, control circuit 30 is modified from that of FIG. 1 to include a beam position circuit 50, AND circuit 60 and amplitude discrimination circuit 70. Beam position circuit 50 contains memory circuits which store the values of the facet width as measured in pixels. With input to the circuit of signals from SOS and EOS sensors 10c, 10d, and a signal representing rotational of polygon 10b (motor 10m signal speed), an output signal is generated whose amplitude represents the instantaneous position of the beam along the width of the scanning facet. This instant beam position signal is sent to AND gate 60, which generates an output signal upon receipt of the belt hole signal from unit 36a. The output signal from AND gate 60 has an amplitude which is dependent upon the instantaneous beam position along the scan facet. The beam signal is operated upon by amplitude discrimination circuit 70, which produces one of two output signals, S1 or S2. Output signal S1 (FIG. 4a) is a signal corresponding to a beam position after the mid-scan and output signal S2 corresponds to a beam position before mid-scan position. When signal S1 is generated and sent to laser 10a driver, the circuit causes the first line of the image frame to be written on the next crossing of the SOS sensor 10c, thus forming the "first line actual 20a'" (FIG. 4a). The maximum error possible for this case, as shown, is 0.00125 inch, with the actual registration error being even less. For case 2, the signal S2 is sent to the laser drive circuit which causes the intended first line image to be discarded and instead, causes the second line of the image to be written at the next SOS crossing. The registration error is then compared to the intended position of the second line and the maximum possible error is again limited to a value no greater than ½ scan line spacing, or 0.00125 inch for the 400 spi example, with the actual registration error again being a smaller amount. The discarding of the first line of an image frame will almost certainly not result in loss of any image information, since the top (lead) edge of an image page is usually blank. As shown in FIG. 4, the successive lines for each case are formed with the normal line spacing. It is understood that the four ROS imagers will all operate with the same conditions and use the same circuitry to establish subpixel registration from frame to frame.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming multiple image exposure frames on a photoconductive member during a single pass including:
    a photoreceptor belt adapted to accommodate the formation of an integral number of image exposure frames,
    a plurality of Raster Output Scanners (ROS) units, each ROS unit forming one of said image exposure frames, each ROS unit projecting a plurality of scanning beams in a fast scan (transverse) direction across the belt width, by scanning modulated beams from the facet surfaces of a rotating polygon, each facet having a width W,
    start of scan (SOS) and end of scan (EOS) sensor means for controlling the start and end of the scanning beams,
    belt position detector means for detecting the location of the leading edge of an exposure frame and for generating an output signal to the ROS unit to write the first line of the image frame, and
    control circuitry for detecting the instantaneous scanning beam position on the instantaneous scanning facet at the time of generation of said belt position detector means output signal and for controlling said ROS unit so as to initiate the first image scan line at the next SOS sensing if the beam position has been found at a distance along the facet greater than W/2 and to initiate the second image scan line at the next SOS sensing if the beam position is at a distance along the facet which is less than W/2.

2. A method for registering a plurality of image exposure frames sequentially formed on the surface of a photoreceptor belt moving in a process direction, including the steps of:
    directing a modulated beam onto the facets of a rotating multifaceted polygon, each facet reflecting the incident beam as a transverse scan beam onto the photoreceptor belt,
    detecting the leading edge of each exposure frame and generating a signal representative thereof,
    applying the leading edge detected signal to a control circuitry for determining the instant location of the scanning beam along the surface of the instant scanning facet,
    writing the first image line of the image exposure frame, if the scanning beam is determined to be past the mid-position on the facet, and
    writing the second line of the image exposure frame, if the scanning beam is determined to be prior the mid-position of the facet.

* * * * *